United States Patent [19]

Stevenson et al.

[11] 3,819,492
[45] June 25, 1974

[54] DISTILLATION OF AROMATIC KETONE FROM AROMATIC ALCOHOL WITH ACID

[75] Inventors: John L. Stevenson; William E. Archibald, both of Big Spring, Tex.

[73] Assignee: Cosden Oil & Chemical Company, Big Spring, Tex.

[22] Filed: Nov. 8, 1971

[21] Appl. No.: 196,768

[52] U.S. Cl. .................... 203/34, 203/38, 203/51, 203/61, 260/592
[51] Int. Cl. ............................................. B01d 3/34
[58] Field of Search ............. 203/34, 35, 38, 51, 61, 203/56, 6, 81; 260/592

[56] References Cited
UNITED STATES PATENTS

| 2,214,117 | 9/1940 | Boese | 260/592 |
|---|---|---|---|
| 2,507,048 | 5/1950 | Porter et al. | 260/592 |
| 2,545,870 | 3/1951 | Baker et al. | 260/592 |
| 2,623,072 | 12/1952 | Ray | 203/81 X |

Primary Examiner—Norman Yudkoff
Assistant Examiner—David Edwards

[57] ABSTRACT

A process for purifying aromatic ketones from admixture with difficultly separable aromatic acid and alcohol derivatives of said ketone by distillation in the presence of a catalytic amount of a mineral acid.

11 Claims, 1 Drawing Figure

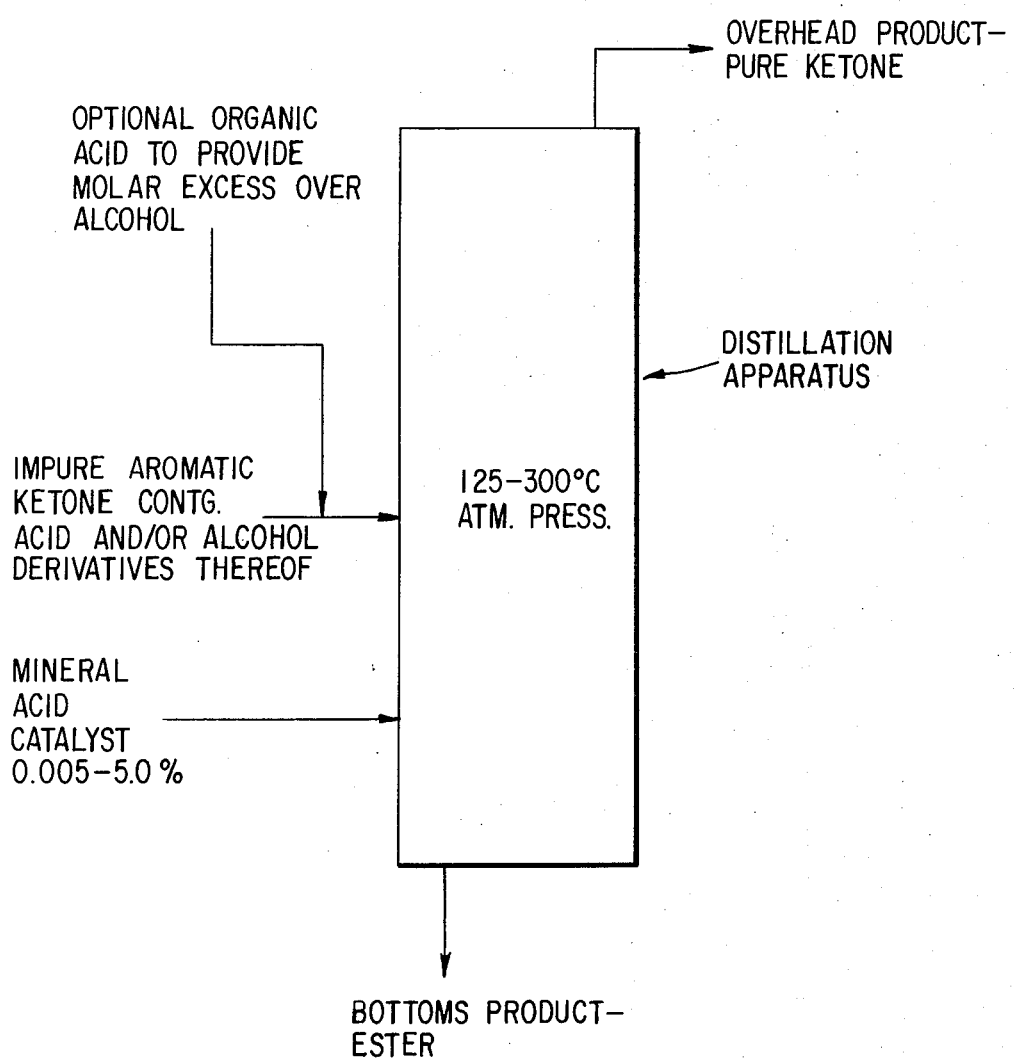

DISTILLATION OF AROMATIC KETONE FROM AROMATIC ALCOHOL WITH ACID

BACKGROUND OF THE INVENTION

The present invention relates to the purification of aromatic ketones. More particularly, the present invention relates to the purification of aromatic ketones from mixtures containing difficultly separable acids and alcohols.

In the preparation of aromatic ketones by means of oxidation of the corresponding aromatic hydrocarbons, particularly when employing cobalt complexes and the like as catalysts, significant amounts of the acid and alcohol derivatives of such aromatic ketone are also produced. For example, the preparation of acetophenone by means of oxidation of ethylbenzene in the presence of a cobalt complex catalyst may result in the formation of not only the desired acetophenone but also, significant quantities of benzoic acid and phenylmethylcarbinol. Primarily because of the presence of the phenylmethylcarbinol, it is relatively difficult to recover the acetophenone product from its admixture with the benzoic acid and the alcohol. In the oxidation of diethylbenzene in similar fashion, an even more complex product mixture containing acid and alcohol impurities is obtained.

While the above oxidation product mixtures can be separated by such conventional means as distillation, it is quite difficult. Other presently known separation techniques such as extractive distillation, clathration, precipitation, and the like, likewise do not presently offer satisfactory means of recovering the desired aromatic ketones from the oxidation product mixture.

It is an object of the present invention to provide a new and improved means for separating and recovering aromatic ketones.

An additional object of the present invention is to provide a new and improved process for separating aromatic ketones from admixture with the difficultly separable acid and alcohol derivatives thereof.

Still another object of the present invention is to provide a process for purifying aromatic ketones produced by the oxidation of aromatic hydrocarbons in the presence of cobalt complex catalysts from admixture with the difficultly separable acid and alcohol derivatives of such aromatic ketones.

A remaining object of the present invention is to provide a new and improved process for recovery of acetophenone from admixture with benzoic acid and phenylmethylcarbinol.

Additional objects will become apparent with the following description of the invention herein disclosed.

SUMMARY OF THE INVENTION

The present invention, which fulfills the above and other objects, is a process which comprises subjecting an aromatic ketone in admixture with difficultly separable aromatic acid and alcohol derivatives of said ketone to distillation in the presence of a catalytic amount of an acid capable of catalyzing an esterification reaction between said acid and said alcohol, and removing said aromatic ketones as an overhead product. In the preferred practice of the present invention to produce the aromatic ketone in very high purity, organic acids are present in said distillation column in molar excess to said alcohol. In the event such acids are not present in such excess, in order to obtain such high purity aromatic ketones, it is desirable to either intermittently or continuously add additional organic acid.

By means of the process of the present invention, the aromatic ketone may be readily recovered from admixture with its aromatic acid and alcohol derivatives in, if desired, very high purity.

BRIEF DESCRIPTION OF THE DRAWING

The Drawing is a flow diagram representation of the distillation purification method according to the present invention.

DESCRIPTION OF THE PREFERRED EMBODIMENTS OF THE PRESENT INVENTION

The process of the present invention finds application in the recovery of aromatic ketones from admixture with difficultly separable aromatic acid and alcohol derivatives of said aromatic ketones. Of course, by adding alcohol or organic acid, as the case may be, to provide reactants for esterification, the aromatic ketone may be separated from either difficultly separable alcohols alone or acids alone. However, the greatest problem in the recovery of aromatic ketones occurs with mixtures in which aromatic alcohols or a mixture of aromatic acid and alcohol derivatives of said ketone are present. When both the aromatic acids and alcohols are present in the reaction mixture, the recovery of the aromatic ketone is simplified. In such instance, it generally is not necessary to add any significant quantity of reactants to the reaction product in order for esterification to take place.

The present invention finds its greatest applicability through recovery of aromatic ketones from product mixtures containing both aromatic acids and aromatic alcohols. Such product mixtures result from the oxidation of aromatic hydrocarbons such as ethylbenzene, diethylbenzene, methylethylbenzenes, propylbenzenes, dipropylbenzenes, triethylbenzenes, tetraethylbenzenes, and the like. A particularly useful application of the process of the present invention is in the recovery of acetophenone from a reaction product containing benzoic acid and phenylmethylcarbinol which reaction product may be obtained by oxidation of ethylbenzene in the presence of a cobalt complex catalyst.

In separating and recovering aromatic ketones from admixture with aromatic acid and/or aromatic alcohol derivatives thereof in accordance with the present invention, such mixture is treated under esterification conditions with a strong mineral acid capable of catalyzing an esterification reaction between said aromatic acid and said aromatic alcohol. As indicated above, the primary basis of the problem of separating and purifying the aromatic ketones generally is the alcohol derivative thereof. Therefore to insure complete removal of such alcohol derivative and thus, higher purity aromatic ketone, it usually is desirable to have esterifiable organic acid present in molar excess to the difficultly separable alcohol. In such manner, if the process conditions herein disclosed are followed, all or virtually all of the separation hindering alcohol is converted to ester. Such ester product generally is sufficiently higher boiling and free from azeotrope formation to permit ready distillation of the desired aromatic ketones from the mixture.

In the event a molar excess of the esterifiable organic acid is not present in the mixture being separated, to effect the most efficient separation and recovery of the desired aromatic ketone, it will be necessary to add to the treating process of the present invention, sufficient such esterifiable acid to cause such molar excess. Preferably, the amount of esterifiable organic acid present will be within the range of 1 to 5 moles, preferably 1 to 3 moles, per mole of alcohol which it is desired to remove from the mixture. If the addition of the acid is required to provide molar excess, usually acid of the type already present, if any, is added. However, the present invention is not limited to such since any esterifiable organic acid may be added, the only criteria being that the acid added is not one which itself is difficultly separable from the desired aromatic ketone or will form an ester with the alcohol which itself is difficultly separable from such ketone.

Treatment of the impure aromatic ketone product containing difficultly separable aromatic acid and alcohol impurities with the mineral acid catalyst may take place as a separate step or concurrently with distillation. From the standpoint of commercial practicality, most often it is desired to so treat the aromatic ketone containing mixture concurrently with distillation either by continuously or intermittently adding the mineral acid catalyst to a distillation zone while continuously introducing the impure aromatic ketone containing mixture. In the preferred operation of the process of the present invention, the impure aromatic ketone is continuously fed into a distillation zone in such manner as to bring the ketone stream into intimate contact with the mineral acid catalyst. This may be accomplished in any number of ways such as by introducing the impure ketone stream into the distillation column below the liquid level of the mineral acid catalyst which is maintained at a desired level in the bottom of the column and at a temperature sufficient to vaporize the aromatic ketone from the acid catalyst mixture. Alternately, the impure aromatic ketone mixture and acid catalyst may be introduced into the distillation column separately at points above the column bottom and permitted to flow concurrently in intimate contact with one another to the bottom of the column, aromatic ketone vapors passing upward countercurrent to such downflowing stream. Those skilled in the art will readily understand many other arrangements and modifications for providing contact of the impure aromatic ketone product stream with mineral acid and the subsequent or concurrent distillation of the aromatic ketone from the resulting mixture. However, so long as such arrangements and modification provide for contacting the impure aromatic ketone stream containing aromatic acid and/or alcohol impurities with a strong acid capable of bringing about reaction between the alcohol and the acid, and distillation of the aromatic ketone from the resulting mixture, they are within the spirit and scope of the present invention.

The mineral acid employed as the catalyst may be any of the common such acids, i.e., $HNO_3$, $HCl$, $H_2SO_4$ or $H_3PO_4$. Preferably, however, the mineral acid is $H_2SO_4$. The amount of such acid employed is a catalytic amount. This amount usually will represent 0.005 to 5.0 percent by weight, more often 0.01 to 3.5 percent by weight, of the total weight of alcohol and organic acid present in the aromatic ketone containing mixture to be treated in accordance with the present invention. Preferably, this amount is within the range of 0.1 to 2.75 percent by weight of said total weight of alcohol and organic acid.

Conditions of temperature and pressure for converting the organic acid and alcohol to their ester in the presence of the mineral acid may vary widely. For the esterification reaction alone, ambient temperatures and pressures may be employed though temperatures will increase due to the exothermic nature of the esterification. Such elevated temperatures may be tolerated without disadvantage in the process of the present invention. Of course, if esterification of the organic acid and alcohol is to take place concurrently with distillation of the aromatic ketone, elevated temperatures sufficient to distill the aromatic ketone from the esterification mixture are employed. Such temperatures will vary widely depending upon the particular aromatic ketone involved and may be further varied by the use of subatmospheric or superatmospheric pressures. However, such elevated temperatures will generally be within the range of 125° to 300° C.

With the preferred application of the process of the present invention which is the recovery of acetophenone from admixture with phenylmethylcarbonol and/or benzoic acid, the treatment of the mixture with mineral acid and the concurrent distillation of the acetophenone from the mixture is carried out at a temperature of 125° to 200° C, preferably 150° to 180° C.

To further describe and to demonstrate the process of the present invention, the following examples are presented. These examples are not to be construed as limiting of the present invention.

EXAMPLE 1

A mixture of 2,000 ml. of acetophenone, 81.8 percent by weight, phenylmethylcarbinol, 8.2 percent by weight and benzoic acid, 10.0 percent by weight was introduced into a distillation unit of approximately 10 stage efficiency. To this mixture was added 5 ml. (9.15 grams) of a concentrated sulphuric acid. The resulting mixture was then distilled. The overhead vapors were condensed and analyzed and found to have the following composition: acetophenone 98.9 percent by weight and phenylmethylcarbinol 0.06 percent by weight.

EXAMPLE 2

Example 1 was repeated with the exception that no mineral acid was added. Upon analysis, the overhead vapors were found to have the following composition: acetophenone 95.3 percent by weight and phenylmethylcarbinol 4.3 percent.

EXAMPLE 3

Example 1 is again substantially repeated with the exception that the amount of sulphuric acid is 1 ml. On analysis, the overhead vapors are found to substantially be free of phenylmethylcarbinol.

EXAMPLE 4

Example 1 is again substantially repeated with the exception that nitric acid is employed instead of sulphuric acid in approximately the same weight. The overhead vapors are found to be substantially free of phenylmethylcarbinol.

What is claimed is:

1. A process for the purification of an aromatic ketone from admixture with difficultly separable aromatic alcohol and aromatic acid derivatives thereof, said process comprising adding to said mixture a sufficient quantity of an organic acid esterifiable with said alcohol derivative to produce at least about molar equality of alcohol and acid in said mixture, combining said mixture with a catalytic amount of a mineral acid and subjecting the resulting mixture to distillation condition, whereby the alcohol and acid react to form an ester and said ketone is separated overhead as a pure product.

2. The process of claim 1 wherein said aromatic ketone is acetophenone and said alcohol is phenylmethyl carbinol.

3. The process of claim 2 wherein said organic acid is benzoic acid.

4. The process of claim 1 wherein said mineral acid is $H_2SO_4$.

5. The process of claim 1 wherein said mineral acid is $HNO_3$.

6. The process of claim 1 wherein said catalytic amount of mineral acid is within the range of 0.001 to 5 percent by weight of the total weight of said aromatic alcohol and said reactant organic acid.

7. The process of claim 1 wherein said mineral acid is $H_3PO_4$.

8. The process of claim 1 wherein said organic acid is selected from the group consisting of said difficultly separable organic acid derivative of said aromatic ketone, an organic acid non-difficultly separable from said aromatic ketone and mixtures thereof.

9. The process of claim 8 wherein the sum of the aromatic acid derivative of said ketone and the added organic acid is present in the amount of 1 to 3 moles per mole of aromatic alcohol.

10. The process of claim 8 wherein said organic acid is said difficultly separable aromatic acid derivative of acid aromatic ketone.

11. The process of claim 8, wherein said added organic acid is an organic acid non-difficultly separable from said aromatic ketone.

* * * * *